United States Patent [19]

Bruso et al.

[11] 4,441,520

[45] Apr. 10, 1984

[54] HYDRAULIC FLUID RESERVOIR SYSTEM

[75] Inventors: Frederick G. Bruso, Hartland; Frank H. Walker, Grand Blanc; Harry H. Lyon, Farmington Hills, all of Mich.

[73] Assignee: General Motors Corporation, Detroit, Mich.

[21] Appl. No.: 412,135

[22] Filed: Aug. 27, 1982

[51] Int. Cl.³ .............................................. G05D 9/02
[52] U.S. Cl. ...................... 137/44; 60/585; 137/453; 188/352
[58] Field of Search .................... 60/585; 137/44, 453, 137/454, 261, 576; 184/103 R; 188/352

[56] References Cited

U.S. PATENT DOCUMENTS

| 2,081,315 | 5/1937 | Weber | 184/103 R |
| 2,207,527 | 7/1940 | Weber | 137/453 X |
| 2,746,253 | 5/1956 | Anderson | 137/453 |

FOREIGN PATENT DOCUMENTS 1405591  9/1975  United Kingdom .................. 60/585

*Primary Examiner*—Robert G. Nilson
*Attorney, Agent, or Firm*—D. D. McGraw

[57] ABSTRACT

An upper sealed reservoir and a lower vented reservoir are connected by a conduit and tube extending into the lower reservoir. A shroud forms a chamber around the end of the tube within the lower reservoir and is vented at its upper end. Openings are provided in the tube and the shroud and are indexed in diametrically opposite relation, with the opening in the tube pointing in the direction of the center of the lower reservoir. The arrangement maintains proper hydraulic fluid level balance between the two reservoirs under a wide range of vehicle attitudes and accelerations. When either the vehicle attitudes or acceleration, or both, momentarily reorients the actual fluid level in the lower reservoir and the shroud, trapped fluid within the shroud chamber prevents air from entering the upper reservoir through the tube and conduit so that excess fluid cannot flow into the lower reservoir from the upper reservoir. The apertures are so positioned as to define a predetermined fluid level in the shroud and the lower reservoir chamber which is normally maintained under static conditions.

3 Claims, 3 Drawing Figures

HYDRAULIC FLUID RESERVOIR SYSTEM

The invention relates to a multiple reservoir system for hydraulic devices such as brake master cylinders. It more particularly relates to such a system in which fluid is transferred by gravity from a sealed upper reservoir to a lower reservoir mounted on the device using the hydraulic fluid. Fluid is transferred from the upper reservoir to the lower reservoir through a connecting conduit only when a bubble of air can enter the conduit at the lower reservoir and pass from the lower reservoir to the upper reservoir, displacing a volume of hydraulic fluid equal to the volume of the air bubble. The pressure of the air and the hydraulic fluid in the upper reservoir is slighty below atmospheric pressure. This arrangement as so far described is well known and has been used in various applications where it is desirable to maintain a substantially constant fluid level in a lower reservoir or sump while having sufficient hydraulic fluid reserve to minimize constant tending by an operator.

The invention includes the addition of a shroud or third reservoir inside the lower reservoir, with appropriately located apertures rendering the system particularly useful when installed in automotive vehicles. Such vehicles are subject to wide variations in vehicle attitude relative to the horizontal and to variation in acceleration and braking. These variations affect the orientation of the fluid level in both reservoirs, and is of particular concern in the lower reservoir. It is desirable that the fluid at all times cover the port or ports serving the hydraulic device using the fluid. At the same time, fluid should not overfill the lower reservoir so as to run the risk of being spilled. By enclosing the lower end of the communicating conduit within the lower reservoir and shrouding it from the remainder of that reservoir, it is possible to control the access of air to the conduit for a large number of conditions. The shroud forming the third reservoir and enclosing the communicating pipe or conduit is constructed as a chamber surrounding the conduit end and concentric with it. An aperture is provided in the conduit approximately at the desired fluid level for the lower reservoir, permitting fluid communication between the inside of the conduit and the surrounding chamber formed by the shroud. At a location in the shroud preferably opposite the conduit aperture, and at approximately the same level, another aperture is provided in the side wall of the shroud to connect the chamber within the shroud to the main chamber of the lower reservoir. The aperture in the conduit is indexed to point in the direction of the center of the lower reservoir and the aperture in the shroud is indexed to point approximately 180° from this position. The system will then maintain the proper fluid level balance between the two reservoirs over a wide range of vehicle attitudes and accelerations which cause changes in orientation of the fluid level in the lower reservoir.

When the fluid level in the lower reservoir is biased by vehicle attitude or acceleration to momentarily raise the forward edge of the fluid level in the shroud chamber formed about the lower end of the conduit, the entire shrouded end of the conduit is below the surface of the fluid in the lower reservoir, and no air can enter the upper reservoir system. When the fluid level in the lower reservoir is biased by vehicle attitude or acceleration to momentarily lower the forward edge of the fluid level of the lower reservoir in the location of the lower end of the conduit and the shroud, the fluid trapped in the shrouded chamber around the lower end of the conduit is similarly biased, so that the fluid rises in the proximity of the aperture in the conduit, again preventing air from entering the upper reservoir system. Therefore in either condition the hydraulic fluid in the upper reservoir does not enter the lower reservoir so as to overfill the lower reservoir. Under steady state level conditions, if the fluid level in the lower reservoir is below the top edges of the apertures, and particularly the aperture in the lower portion of the conduit, an air bubble will be allowed to enter the conduit and displace hydraulic fluid from the upper sealed reservoir to the lower vented reservoir. Thus the lower reservoir is refilled as is necessary to make up lost fluid, but is not overfilled because of vehicle attitude and acceleration.

IN THE DRAWING

Figures 1, 2:
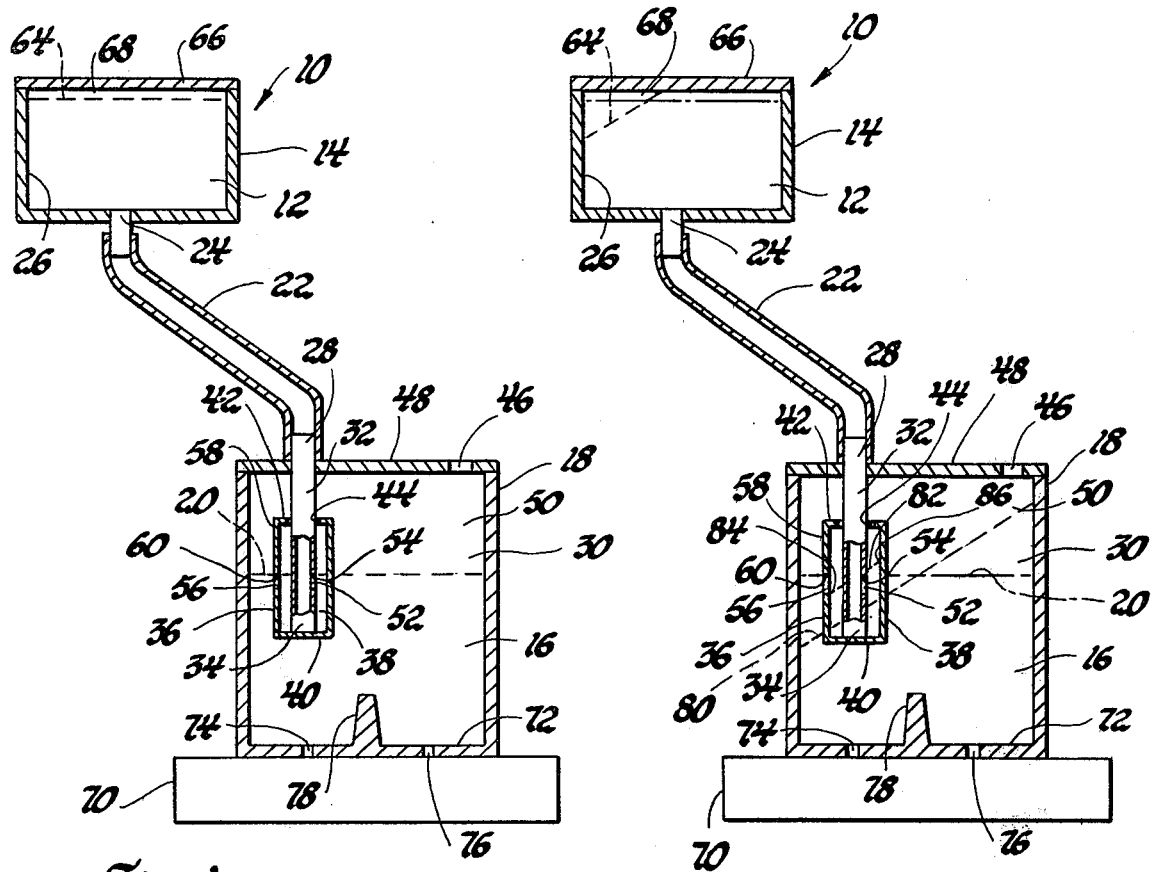
FIG. 1 is a schematic representation, in cross-section, illustrating a hydraulic fluid reservoir system embodying the invention. The hydraulic fluid level in the lower reservoir is shown as being static, horizontal, and at the predetermined desired level.
FIG. 2 is similar to FIG. 1 but shows the system when the fluid levels in the reservoirs are angularly biased in one direction relative to the fluid level orientation of FIG. 1.

The system 10 is illustrated in FIG. 1 in a static condition with hydraulic fluid 12 substantially filling the upper sealed reservoir 14, and the hydraulic fluid 16 in the lower reservoir 18 having a predetermined static fluid level 20. The conduit 22 connects the outlet 24 from chamber 26 of reservoir 14 with the inlet 28 of chamber 30 of lower reservoir 18. The inlet 28 has an inlet tube or pipe 32 received therethrough so that its upper end accommodates the lower end of conduit 22. Inlet tube 32 may be considered to be a part of conduit 22 for descriptive purposes. The lower end 34 of inlet tube 32 extends into chamber 30 below predetermined fluid level 20 of that chamber.

A shroud 36 is received about the lower portion of inlet tube 32 and is positioned within chamber 30 of reservoir 18. The shroud is essentially a third fluid reservoir having a fluid chamber 38 defined therein and extending about the lower portion of tube 32. The bottom 40 of shroud 36 is below the predetermined fluid level 20 of chamber 30 and the top 42 of the shroud is above fluid level 20. A suitable vent 44 is provided at the top of shroud 42 so that the fluid chamber 38 within the shroud is vented into the upper portion of chamber 30 above the predetermined fluid level 20. The upper portion of chamber 30 is also schematically represented as having a vent 46 formed in the reservoir top 48 venting the upper portion of chamber 30 to the atmosphere. Therefore, air 50 is contained within the upper portion of chamber 30 above the fluid level 20, and is also contained in the upper portion of fluid chamber 38. An opening 52 is formed in the side wall of inlet tube 32 so that the top edge 54 of opening 52 is at the predetermined fluid level 20. Opening 52 is oriented so as to point in the direction of the center of the lower reservoir chamber 30. In an automotive vehicle installation, this may be rearward. An aperture 56 is formed in the side wall 58 of the shroud 36 so that its top edge 60 is also positioned at the predetermined fluid level 20. Aperture 56 is located diametrically opposite opening 52 of inlet tube 32. In an automotive vehicle installation, this may be forward.

When the system is static, as illustrated in FIG. 1, the hydraulic fluid 16 is at the predetermined fluid level 20 in chamber 30 of reservoir 18 and also in chamber 38 of shroud 36. The conduit 22 and tube 32 are filled with hydraulic fluid and hydraulic fluid 62 is contained in the chamber 26 of the upper reservoir 14. The fluid level 64 of fluid 62 is illustrated as being immediately adjacent the top 66 of reservoir 14. An air space 68 is above the fluid level 64. Since the air space 68 is sealed, the fluid 62 cannot be displaced out of reservoir 14 unless it is replaced by air entering the reservoir through conduit 22 and outlet 24.

Reservoir 18 is schematically illustrated as being a reservoir for a master cylinder 70. The bottom 72 of reservoir 18 is therefore provided with suitable compensation ports 74 and 76. A dam 78 is provided on the bottom 72 of the reservoir so as to separate the bottom portion of chamber 30, thereby preventing total loss of hydraulic fluid from the master cylinder should the fluid level go below the top of the dam.

Assuming that the system 10 is installed in a vehicle traveling leftwardly as seen in the drawing, and that the vehicle is being subjected to positive acceleration, or the vehicle is on an upgrade, the fluid in the system will be oriented along the lines illustrated in FIG. 2. The fluid level 64 in reservoir 14 will assume an angle such as that illustrated, with the rear portion or edge of the fluid level being higher within the chamber 26 than the forward portion or edge of the fluid level. The actual fluid level 80 in chamber 30 of the lower reservoir 18 will be nearer the reservoir top 48 at the rear side than at the forward side of the actual fluid level. It will therefore be oriented at an angle relative to the predetermined fluid level 20. The actual fluid level 82 in chamber 38 of shroud 36 will have the same angular orientation as does the actual fluid level 80. The forward side 84 of fluid level 82 will be below the top edge 60 of aperture 56, therefore, connecting the air 50 through aperture 56 with the air space in the upper portion of chamber 38 of shroud 36. However, the portion 86 of the fluid level 82 immediately adjacent opening 52 will be above the top edge 54 of that opening, effectively sealing the interior of inlet tube 32 against the entry of an air bubble, thereby preventing any air from entering the sealed reservoir 14 through the conduit 22, and preventing the lower reservoir 18 from being overfilled in this condition of operation.

Figure 3:
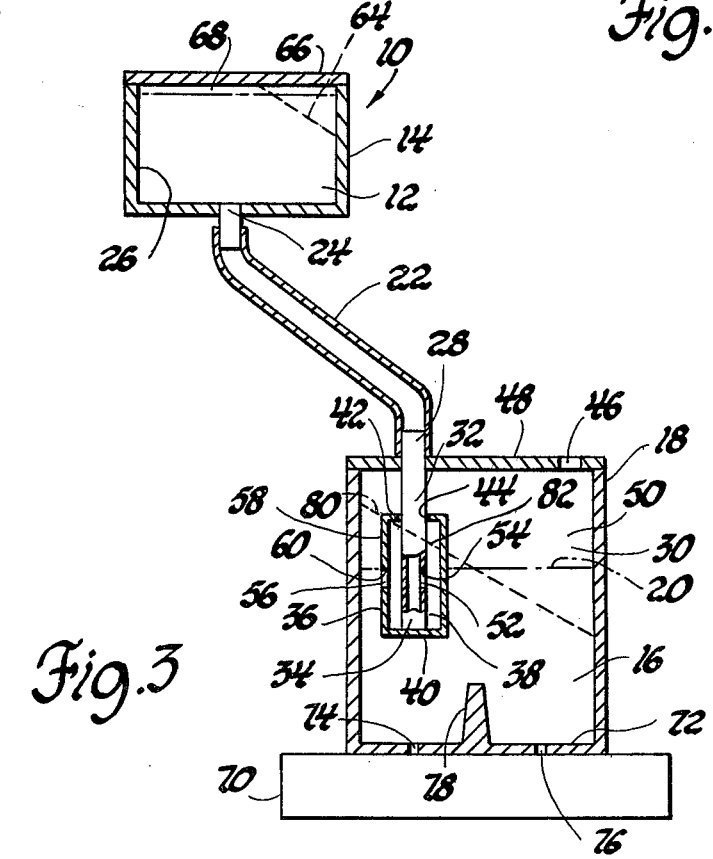
FIG. 3 is similar to FIG. 2 and shows the fluid levels in the reservoirs being angularly biased relative to the fluid level orientation shown in FIG. 1 and in the opposite direction from that of FIG. 2.

FIG. 3 is similar to FIG. 2 but shows the vehicle in a negative acceleration condition or in the attitude when it is descending a grade. Under this condition, the fluid level 64 and the actual fluid level 80 and 82 in chambers 30 and 38 are angularly reversed, with their forward sides being nearer the tops of their respective reservoirs than their rearward sides. In this instance the fluid contained in the shroud chamber 38 covers both openings 52 and 56, and the fluid in chamber 30 also covers the outer side of opening 56. Therefore, an air bubble is again prevented from entering the opening 52, and no fluid is displaced from the upper reservoir 14 through conduit 22 and tube 32 into the lower reservoir 18.

The embodiments of the invention in which an exclusive property or privilege is claimed are defined as follows:

1. In a hydraulic fluid reservoir system for a hydraulic device such as a vehicle master cylinder adapted for operation at various vehicle attitudes with a condition of vehicle movement either steady, accelerating or decelerating, said system having a sealed first reservoir, a vented second reservoir in gravity flow communication with said first reservoir so that under certain conditions hydraulic fluid in said first reservoir may flow into said second reservoir and air from said second reservoir may flow to said first reservoir, a conduit extending into said second reservoir substantially fixed with respect thereto and having an opening located at a predetermined level of hydraulic fluid in said second reservoir when the condition of vehicle movement is steady sufficient to provide satisfactory operation of said hydraulic device at all vehicle operational attitudes and conditions of vehicle movement, the improvement comprising:

a shroud around said conduit at said opening and defining with said conduit a fluid chamber into which said opening opens at said predetermined level, said shroud having a vent at the upper part thereof venting said chamber into said second reservoir and an aperture substantially in a horizontal plane with said opening at a level one of said various vehicle attitudes but spaced from said opening, said aperture providing communication between said chamber and said second reservoir for hydraulic fluid or air in accordance with vehicle attitude and condition of movement;

said shroud cooperating with said conduit to prevent air from entering said conduit through said opening during all vehicle operational attitudes and conditions of movement so that a level of hydraulic fluid is always maintained in said fluid chambers in blocking relation to said opening irrespective of the level of hydraulic fluid in said second reservoir resulting from the attitude of the vehicle or its condition of movement, whereby to prevent the unnecessary depletion of hydraulic fluid in said first reservoir by reason of air flow from said second reservoir to said first reservoir because of such attitude or condition of movement.

2. In a hydraulic fluid reservoir system for a hydraulic device such as a master cylinder, said system having a sealed first reservoir, a vented second reservoir and a conduit connecting said reservoir so that hydraulic fluid in said first reservoir may flow through said conduit into said second reservoir and air from said second reservoir may flow through said conduit to said first reservoir, said conduit extending into said second reservoir and having an opening located at the desired level of hydraulic fluid to be maintained in said secondary reservoir, the improvement comprising:

a shroud around said conduit at said opening and defining with said conduit a fluid chamber into which said opening opens at a predetermined chamber level, said shroud having a vent at the upper part thereof venting said chamber into said second reservoir and an aperture in the side thereof at the level of said opening but diametrically opposite said opening, said aperture providing fluid communication between said chamber and said second reservoir;

said shroud cooperating with said conduit to prevent air from entering said conduit through said opening when the hydraulic fluid level in said lower reservoir is biased by vehicle attitude or acceleration to momentarily raise or lower the hydraulic fluid level in said second reservoir at the location of said opening.

3. A fluid reservoir level control system comprising:

a first reservoir defining a closed chamber containing a supply of hydraulic fluid;

a second reservoir defining a vented chamber containing a supply of hydraulic fluid to be maintained at a substantially constant level;

a conduit connecting said reservoirs to permit hydraulic fluid to flow from said first reservoir to said second reservoir and to permit air to flow from said second reservoir to said first reservoir to replace hydraulic fluid therein flowing into said second reservoir, said conduit having a hydraulic fluid discharge and air intake opening at a level within said second reservoir at which the hydraulic fluid level therein is to be maintained;

and a vented third reservoir within said second reservoir and surrounding said conduit opening so that said conduit opening is at a level in said third reservoir at which the hydraulic fluid level therein is to be maintained, said third reservoir having an opening in the side thereof at the level of said conduit opening but not in alignment therewith;

said third reservoir and said openings cooperating to prevent air from entering said conduit through said conduit opening when the hydraulic fluid level in said second and third reservoirs is biased by vehicle attitude or acceleration to momentarily raise or lower the hyraulic fluid level at the location of said conduit opening in said second and third reservoirs, and permitting air to enter said conduit through said opening and hydraulic fluid to flow from said first reservoir through said conduit and said conduit opening into said third reservoir and then through said third reservoir opening into said second reservoir when the hydraulic fluid level in said second and third reservoirs falls below said openings.

* * * * *